US012242647B2

(12) United States Patent
Upadhyayula (10) Patent No.: US 12,242,647 B2
(45) Date of Patent: Mar. 4, 2025

(54) RULE-BASED APPROACH FOR IDENTIFYING ANONYMOUS VISITORS

(71) Applicant: Intuit, Inc., Mountain View, CA (US)

(72) Inventor: Indira Sneha Upadhyayula, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 256 days.

(21) Appl. No.: 18/104,214

(22) Filed: Jan. 31, 2023

(65) Prior Publication Data

US 2024/0256708 A1    Aug. 1, 2024

(51) Int. Cl.
*G06F 21/62*    (2013.01)
(52) U.S. Cl.
CPC ............................... *G06F 21/6254* (2013.01)
(58) Field of Classification Search
CPC .................................................. G06F 21/6254
See application file for complete search history.

(56) References Cited

U.S. PATENT DOCUMENTS

| | | | | |
|---|---|---|---|---|
| 9,203,905 | B1* | 12/2015 | Hong | H04L 67/14 |
| 10,440,009 | B1* | 10/2019 | Manwiller | H04L 63/083 |
| 10,860,703 | B1* | 12/2020 | Manwiller | G06F 21/316 |
| 2015/0058393 | A1* | 2/2015 | Smith | H04L 67/10 709/201 |
| 2016/0142272 | A1* | 5/2016 | Stringham | H04L 43/04 709/224 |
| 2016/0269497 | A1* | 9/2016 | Glommen | H04L 67/306 |
| 2017/0161761 | A1* | 6/2017 | Koh | H04L 41/145 |
| 2017/0214756 | A1* | 7/2017 | Lipka | H04L 67/02 |
| 2017/0235743 | A1* | 8/2017 | Kim | G06F 16/337 707/738 |
| 2018/0338238 | A1* | 11/2018 | Seidman | H04W 8/005 |
| 2019/0007509 | A1* | 1/2019 | Lipka | H04L 67/535 |
| 2021/0194934 | A1* | 6/2021 | Kåberg Johard | H04L 63/1425 |
| 2021/0248129 | A1* | 8/2021 | Paulsen | G06F 7/08 |
| 2021/0271531 | A1* | 9/2021 | Paulsen | G06F 9/542 |

(Continued)

OTHER PUBLICATIONS

Thomas, Ian. "Practice papers Planning for a cookie-less future: How browser and mobile privacy changes will impact marketing, targeting and analytics." (2021).*

(Continued)

*Primary Examiner* — Jimmy H Tran
(74) *Attorney, Agent, or Firm* — Dinsmore & Shohl LLP (57) ABSTRACT

Certain aspects of the disclosure provide a method for managing users, the method comprising: obtaining a first set of visitor identification records; identifying a subset of outlier visitor identification records within the first set of visitor identification records; creating a second set of visitor identification records including all visitor identification records from the first set of visitor identification records other than the subset of outlier visitor identification records; creating a third set of visitor identification records by applying a first filtering scheme to the second set of visitor identification records; creating a fourth set of visitor identification records by applying a second filtering scheme to the second set of visitor identification records; generating one or more stitched visitor IDs by stitching visitor identification records in the fourth set of visitor identification records; and determining a stitching accuracy probability for each of the one or more stitched visitor IDs.

20 Claims, 6 Drawing Sheets

(56) References Cited

U.S. PATENT DOCUMENTS

| | | | |
|---|---|---|---|
| 2021/0281650 A1* | 9/2021 | George | H04L 67/146 |
| 2021/0397661 A1* | 12/2021 | Liversidge | G06Q 30/02 |
| 2022/0174125 A1* | 6/2022 | Glommen | H04L 67/02 |
| 2024/0022642 A1* | 1/2024 | Glommen | H04L 67/306 |
| 2024/0154941 A1* | 5/2024 | Nagpal | H04L 63/20 |
| 2024/0265058 A1* | 8/2024 | Liversidge | H04L 67/146 |

OTHER PUBLICATIONS

Sivan-Sevilla, Ido, and Patrick T. Parham. "Toward (greater) Consumer Surveillance in a 'cookie-less' World: A Comparative Analysis of Current and Future Web Tracking Mechanisms." (2022).*

Papadogiannakis, Emmanouil, et al. "User tracking in the post-cookie era: How websites bypass gdpr consent to track users." Proceedings of the web conference 2021. 2021.*

Marotta, Veronica, Vibhanshu Abhishek, and Alessandro Acquisti. "Online tracking and publishers' revenues: An empirical analysis." Workshop on the Economics of Information Security. 2019.*

* cited by examiner

FIG. 1

| | VID | IP Address | App Context | Device ID | User-Agent Attributes | Date & Time |
|---|---|---|---|---|---|---|
| 201A | 4321 | 10.10.10.101 | Mobile | d03c63ed58a7905b | APP | 22.01.31.17:01 |
| 202A | 4322 | 10.10.10.102 | Mobile | 81dea499b9083caf | APP | 22.02.27.08:35 |
| 203A | 4323 | 10.10.10.102 | Mobile | 81dea499b9083caf | APP | 22.02.27.11:15 |
| 204A | 4324 | 10.10.10.103 | Web | - | Safari | 22.03.26.20:10 |
| 205A | 4325 | 10.10.10.104 | Web | - | Chrome | 22.04.14.18:45 |
| 206A | 4326 | 10.10.10.104 | Web | - | Safari | 22.04.15.06:30 |

STITCHING

| | Stitched VID | VID | IP Address | App Context | Device ID | User-Agent Attributes | Date & Time | Probability |
|---|---|---|---|---|---|---|---|---|
| 201B | c508ddaaaac990a6 | 4321 | 10.10.10.101 | Mobile | d03c63ed58a7905b | APP | 22.01.31.17:01 | Very High |
| 202B | 634eaa9334b93c14 | 4322 | 10.10.10.102 | Mobile | 81dea499b9083caf | APP | 22.02.27.08:35 | High |
| 203B | 634eaa9334b93c14 | 4323 | 10.10.10.102 | Mobile | 81dea499b9083caf | APP | 22.02.27.11:15 | High |
| 204B | 0090a501961e0636 | 4324 | 10.10.10.103 | Web | - | Safari | 22.03.26.20:10 | High |
| 205B | af09377bf42aa46b | 4325 | 10.10.10.104 | Web | - | Chrome | 22.04.14.18:45 | High |
| 206B | af09377bf42aa46b | 4326 | 10.10.10.104 | Web | - | Safari | 22.04.15.06:30 | High |

RULE-BASED APPROACH FOR IDENTIFYING ANONYMOUS VISITORS

Aspects of the present disclosure relate to systems and methods for improving identification and tracking of application users.

User (or visitor) identification and tracking generally relates to collecting information about users and monitoring their interactions with various types of applications, including, for example web-based and mobile device-based applications. Beneficially, such identification and tracking can be used by the application provider to better understand how users interact with the application and to better customize the user's experience, which in-turn improves long-term engagement, conversion, and user experience.

One method for identifying and tracking users is through the use of cookies, which are files saved on a user device containing information about the user. For example, when a user visits a website, the website may store a cookie on the user's device so that the website "recognizes" the user upon the user's next visit to the website. Thus, cookies enable the website to collect information about the user's activity on the website, recognize the user, and customize the user's experience on the website.

However, data privacy concerns and restrictive policies regarding the collection and usage of user data, including cookies, are increasingly regulated by national and international laws having significant punitive provisions for compliance failures. Moreover, user devices are becoming more secure and often significantly restrict, if not entirely disallow, the use of legacy user tracking technologies, such as cookies. Often times these restrictions are implemented at the operating system level, and so are no longer an application-specific configuration option for the user. The technical effect of such restrictions is that a user may not be identifiable to an application provider from one interaction with an application (e.g., a website or mobile application) to another, for example, always appearing as an anonymous user to the application provider. Thus, the provider of the application cannot offer the beneficial aspects discussed above.

Accordingly, there is a need for improved systems and methods for identifying users, which overcome the aforementioned technical limitations of current solutions.

SUMMARY

Certain aspects provide a method for managing users, the method comprising: obtaining a first set of visitor identification records; identifying a subset of outlier visitor identification records within the first set of visitor identification records; creating a second set of visitor identification records including all visitor identification records from the first set of visitor identification records other than the subset of outlier visitor identification records; creating a third set of visitor identification records by applying a first filtering scheme to the second set of visitor identification records; creating a fourth set of visitor identification records by applying a second filtering scheme to the second set of visitor identification records; generating one or more stitched visitor IDs by stitching visitor identification records in the fourth set of visitor identification records; and determining a stitching accuracy probability for each of the one or more stitched visitor IDs.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer-readable mediums for improving identification and tracking of users (e.g., first time and recurring visitors) of applications, such as web-based and mobile applications.

Conventionally, websites and web-based applications have used cookies to identify users (or visitors) of the website and to track returning users. Cookies may collect data related to the user as the user visits the website and other websites. For example, user data may include data related to the device the user is using to access the website, such as device type, device model, context device ID, browser type, operating system, internet protocol (IP) address, etc. As another example, user data may include data related to the user activity on the website, such as date and time the user visits the website, how long the user interacts with the website or certain pages of the website, which functions of the website the user interacts with (e.g., clicks, chats, posts, shopping carts, etc.), and other interactions with the website. In yet another example, user data may include data related to the user's activity on other websites, such as data pertaining to other websites the user visits. These are just some examples, and others are possible. Web-based applications may generally use cookies in the same way as traditional websites for user identification and tracking.

However, as briefly described above, uniquely identifying and tracking application users is becoming increasingly difficult due to increased interest in and regulation of data privacy. In particular, many regulations have been promulgated to protect users' privacy, including limiting collection of data, disclosing data collection to users, providing users with "opt-out" options, and greater protection of user data. Moreover, increasingly, user devices and their integral applications (e.g., web browsers) are configured to limit (e.g., temporally) or altogether block user tracking that requires data to be stored on the user's device, such as blocking first and third-party cookies from being stored on a user's device as the user navigates a website. While protection of user privacy and compliance with laws and regulations are certainly important considerations, there are likewise important benefits to users when, for example, an application provider, is able to recognize the user and customize the user's interaction with the application. Thus, a technical problem exists in the art in which existing methods for identifying and tracking users, especially those that rely on storing data on a user's device, are no longer technically and/or legally feasible.

Aspects described herein overcome this technical problem by providing systems and methods for uniquely identifying users (e.g., website and internet application visitors) effectively without the need to store data on a user device and without the need for heavyweight, computer-intensive, modelling. Specifically, aspects described herein employ a lightweight, computationally efficient, accurate, and fast rule-based method for "stitching" together anonymous users; in other words, correlating (or matching) records related to user visits as relating to one unique user, or one unique household, thus specifically identifying that unique user or household. Accordingly, aspects described herein beneficially enable identification of otherwise anonymous users (e.g., visitors to a website or web-based application) so that the user's experience may be beneficially customized.

Example User Tracking and Identifying System

Generally, when a user visits a website (either directly or through a web-based application), the website may collect various data associated with the visitor in an effort to uniquely identify the user so that the user's experience may be customized and improved. Note that while a website is used as one example herein, the same concepts apply to other contexts, such as web-based application, mobile-device based applications, and the like.

A user may visit a website on multiple different days, weeks, months, etc. To the website, each visit may initially appear to be from a different user, even though it may actually be the same user visiting the website on multiple occasions. The website may store various aspects of user data associated with different visits in visitor identification records to find similarities between the different visits and determine which of the different visits belong to the same user. Then, the website may associate various visitor identification records with the same user, referred to herein as "stitching" the visitor identification records, allowing the website utilize a richer set of user data captured across the multiple visitor identification records, rather than only data from each individual visit. Beneficially, once visitor identification records have been "stitched" together (e.g., associated, correlated, matched, mapped, or otherwise linked), the website may provide a more customized and consistent experience for that user. Further, the website may determine the number of unique users or households visiting the website based on the number of stitched visitor IDs.

In some cases, the website may identify different visits as belonging to a unique household rather than a unique user. For example, multiple members of the same household may visit the website and those visits may be identified as the same household by a common attribute, such as a common IP address (e.g., of an internet modem shared by the household). In another example, one user may use multiple devices (e.g., a smart phone and a laptop) within a home to visit the website and those visits are identified as the same household. The website may then customize the user experience for all visits from the household.

In some embodiments, visitor identification records may be stitched together by assigning one identifier, a stitched visitor ID, to all visitor identification records determined to belong to the same visitor, or in some cases, visitors from the same household.

Figure 1:
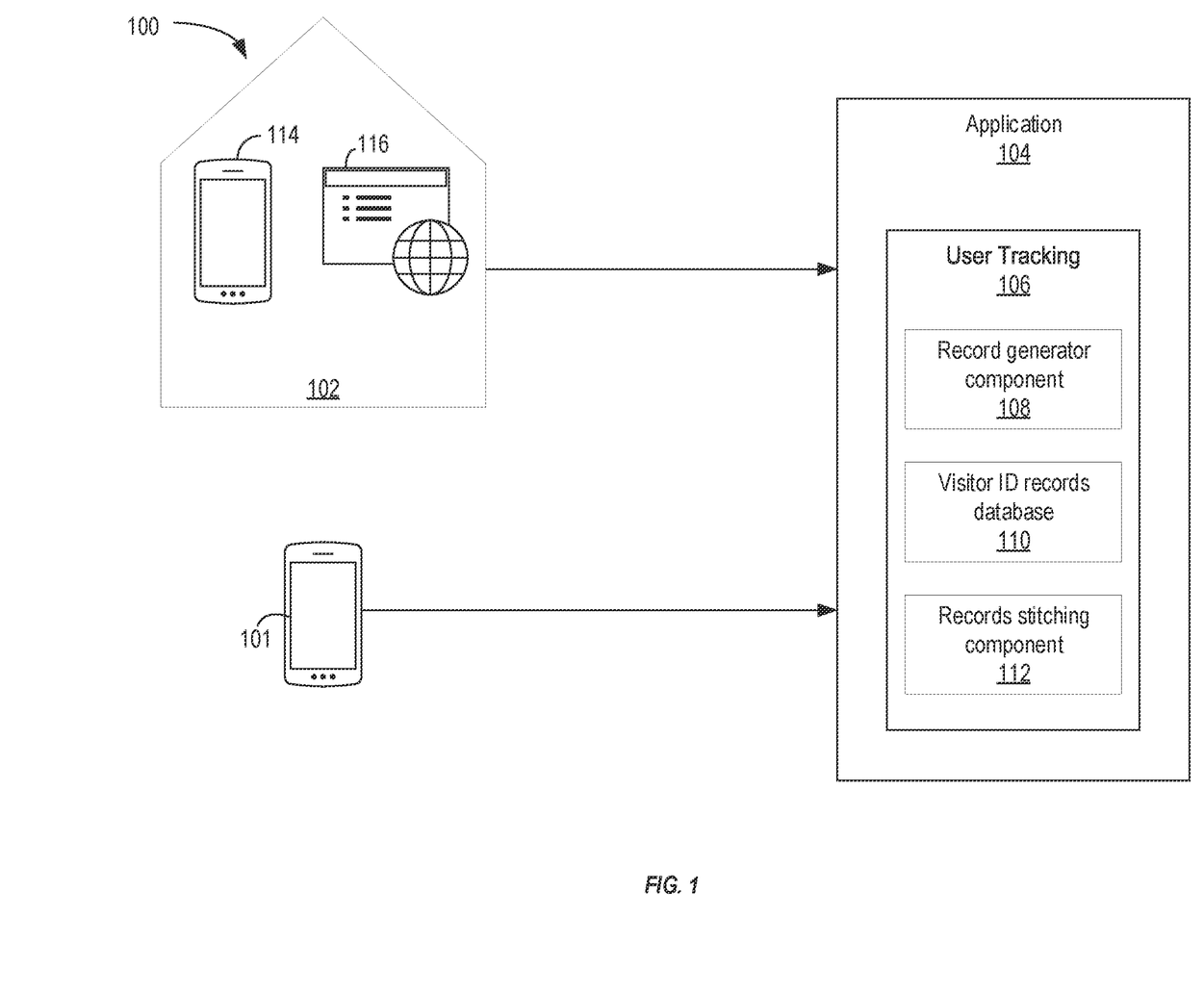
FIG. 1 depicts an example user identification and tracking system.

FIG. 1 depicts aspects of a user identifying and tracking system 100 for identifying visitors to a website as belonging to one user or one household.

Application 104 may generally be configured with an integrated or remote component (e.g., a network connected component) to identify and track users interacting with application 104. In this example, application 104 is a web-based application that may be accessed by web-browser (e.g., 116) or by mobile device (e.g., 114 and 101). In this example, users interacting with application 104 include an individual user of mobile device 101 as well as household 102, which includes users accessing application 104 by mobile device 114 and a web browser 116.

Application 104 generates user data when a user visits the application. User data may include information relating to a device the user uses to connect to application 104, a network the user uses to connect to application 104, user behavior within application 104, and the like.

User tracking element 106 may process user data generated by application 104. In this example, user tracking element includes a record generator component 108, which may be generally configured to generate visitor (or user) identification records associated with each user of application 104.

Figure 2:
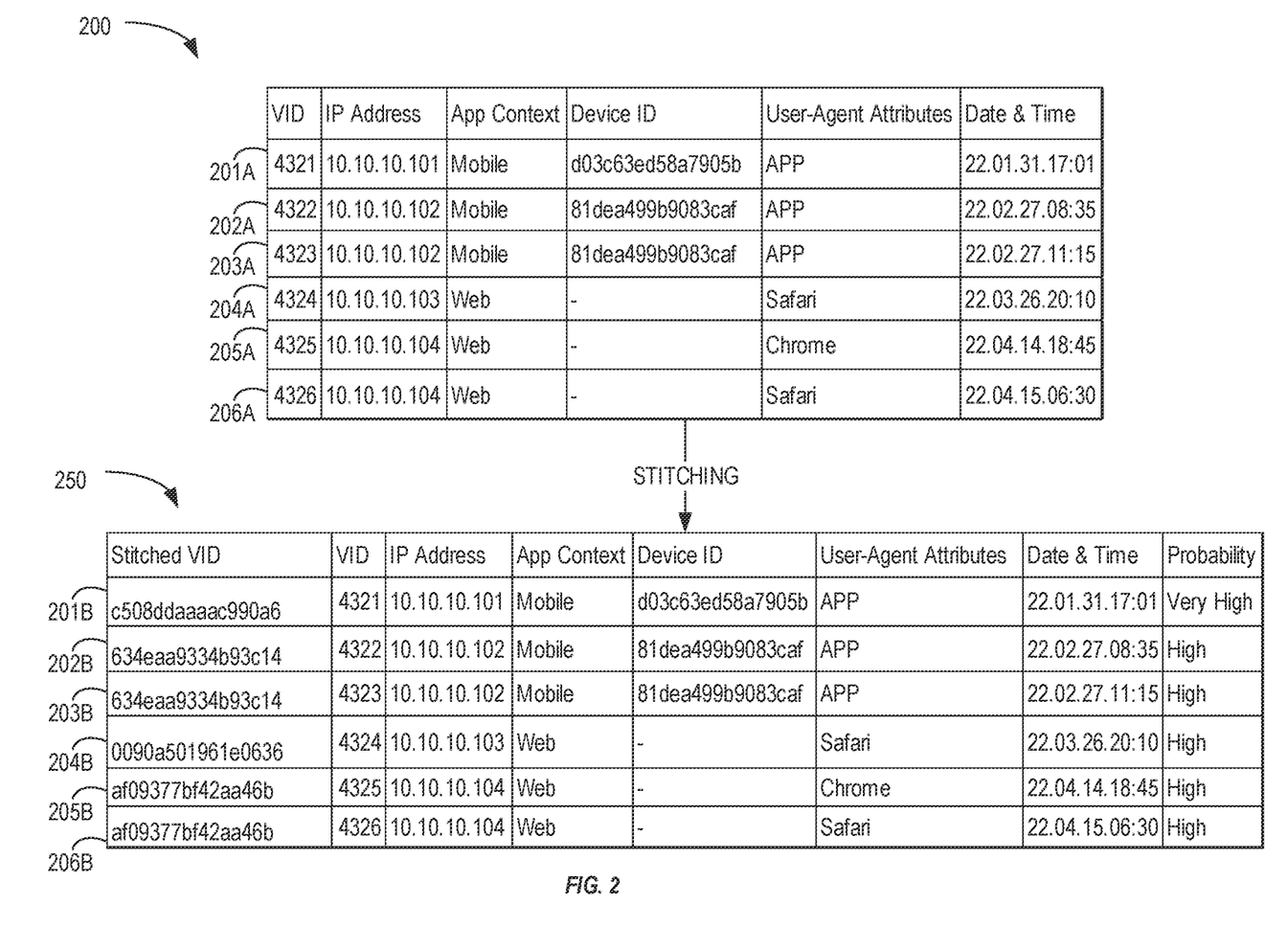
FIG. 2 depicts various example visitor identification records and stitched visitor IDs.

A visitor identification record may include various elements (e.g., data fields) containing information pertaining to a user's "visit" to (e.g. use of) application 104, such as a visitor ID (VID) field, an IP address field, an application context field, a context device ID field, a user-agent attributes field, a date and time field, and a pseudonym ID field, to name a few examples. FIG. 2 depicts examples of visitor identification records with various fields.

Generally, a visitor ID field may be populated by a unique visitor identification which is generated when a new user visits the application.

An IP address field may be populated by an IP address associated with the user visiting the application.

An application context field may be populated by an application context associated with the application used by the user to visit the application. For example, an application context may be mobile web, web-browser, or mobile application.

A context device ID field may be populated by a context device ID associated with a device a user uses to visit the application. For example, a context device ID may be associated with mobile device, such as a smart phone or tablet. In another example, a context device ID may be considered null, where no context device ID is associated with the user, such as when a user visits the application via a web-browser (e.g., 116).

User-agent attributes generally include information about how a user accesses an application, such as information about the device, browser, and connection used by the user, and may be used to facilitate interaction with the end user.

Figure 3:
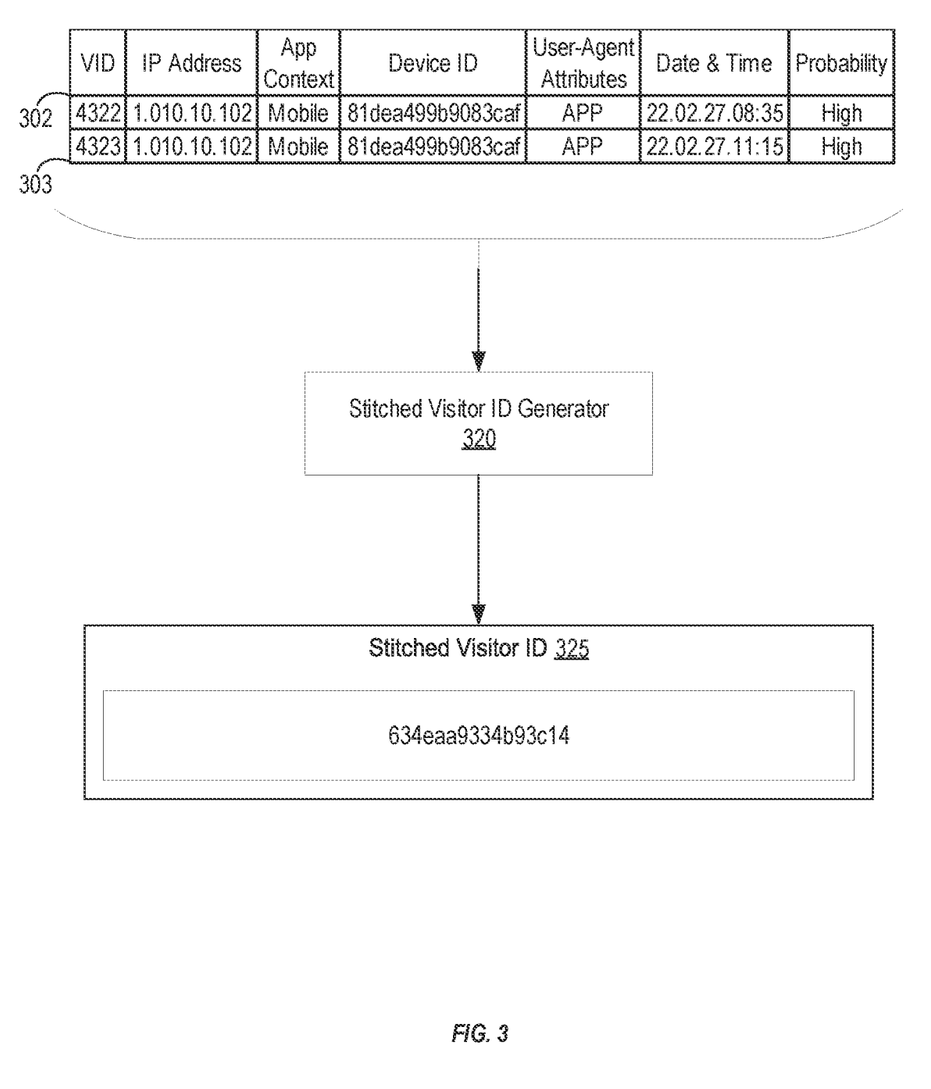
FIG. 3 depicts an example process flow for generating a stitched visitor ID.

A user-agent attribute field may thus be populated with attributes such as: hardware name, hardware model, hardware vendor, platform name, platform version, platform type, browser vendor, browser name, browser version, device type, whether device is mobile, etc. Note that while example user-agent attributes are depicted in FIGS. 2 and 3 as a single attribute, in some embodiments, user-agent attributes may comprise a string of multiple attributes, for example, "Mozilla/5.0 (Windows NT 10.0; Win64; x64) AppleWebKit/537.36 (KHTML, like Gecko) Chrome/98.0.4758.82 Safari/537.36; Mozilla/5.0 (iPhone; CPU iPhone OS 14_8_1 like Mac OS X) AppleWebKit/605.1.15 (KHTML, like Gecko) Version/14.1.2 Mobile/15E148 Safari/604.1; or Dalvik/2.1.0 (Linux; U; Android 11; SM-S102DL Build/RP1A.200720.012)."

A date and time field may be populated by a date and time associated with the user's visit to the application. For example, a date and time may be associated with the date and time the user first visits the application. In another example, a date and time may be associated with the date and time the user leaves the application. In yet another example, a date and time may be associated with a length of time the user on the application, such as a length of time the user spent active on the application, a length of time the user spent active on a certain section (e.g., page), of the application, a length of time the user spent inactive on the application, and the like. In some cases, after visitor ID records have been stitched together, a date and time may be used to determine how recently or frequently a user has visited the application.

A pseudonym ID field may be populated by a pseudonym ID associated with a user account, for example, after the user authenticates with the application. In some examples, a pseudonym ID may not be populated (e.g., null). In some cases, especially where an application cannot store or access cookies on a user's device, such as when a user or user device deletes stored cookies, every time a user visits an application, a new visitor identification record may be generated.

Notably, from one visit to the next, multiple visitor identification records may be generated without knowledge that it is the same user making each visit.

User tracking element 106 further includes visitor identification records database 110, which may be generally configured to store visitor identification records generated by record generator component 108.

User tracking element 106 further includes records stitching component 112, which is generally configured to identify a user as a new or returning user, for example, by stitching visitor identification records to identify records relating to one unique user or one unique household. Stitching records may include correlating, association, and the like, various records together. In some embodiments, stitching records may be associating all records relating to one unique user, such as user of mobile device 101 or one unique household, such as household 102. Stitched records may be associated through various methods for connecting or linking records together, for example, by generating an identifier common to all associated records.

Example methods for records stitching are described in further detail below with respect to FIGS. 4 and 5, which may be implemented by records stitching component 112. Once stitched, data in all visitor identification records stitched together may be stored together as data associated with that unique user or household in visitor identification records database 110.

In various aspects, application 104 may utilize data in stitched visitor records to improve (e.g., customize, adapt, modify, or otherwise control) a user's experience with the application 104. In one example, a lack of stitched visitor records data may identify the user as a new user to application 104 and implement a new user experience for the user. In another example, stitched visitor records data may identify the user as a returning user to application 104 and implement a customized user experience based on the user's previous visits to the application (e.g., using data associated with previous visits stored in stitched visitor identification records).

In one example, various aspects of FIG. 1 may be implemented by the example processing system described below with respect to FIG. 6.

Example Set of Visitor Identification Records Before and After Stitching

FIG. 2 depicts an example set of visitor identification records, such as stored in visitor identification records database 110 in FIG. 1 before and after stitching, such as by records stitching component 112 in FIG. 1.

In the example of FIG. 2, a set of visitor identification records 200 comprises six visitor identification records 201A, 202A, 203A, 204A, 205A and 206A associated with users of a website, such as application 104 in FIG. 1. Each of visitor identification records 201A, 202A, 203A, 204A, 205A and 206A represent a visit to the website, however, the website cannot determine whether each of visitor identification records 201A, 202A, 203A, 204A, 205A and 206A represents the same or a different user visiting the website. Set 200 may be stored in a visitor identification records database, such as visitor identification records database 110, described in FIG. 1.

A records stitching element, such as records stitching component 112 of FIG. 1, may determine which, if any, of visitor identification records 201A, 202A, 203A, 204A, 205A and 206A represent the same person or household and stitch (or associate) all of the records determined to represent the same person or household. After stitching, each visitor identification record 201B, 202B, 203B, 204B, 205B and 206B may be assigned a stitched visitor ID. Generation of a stitched visitor ID is discussed with respect to FIG. 3.

In some embodiments, stitching visitor identification records also includes determining a probability that the visitor identification records being stitched represent the same user or household. A probability may be determined, for example, based on the number and type of assumptions made in determining whether to stitch one or more visitor identification records together. Generally, the more assumptions that need to be made to stitch together two visitor identification records, the lower the probability that they are indeed related to the same user or the same household. Thus, the number of assumptions may be considered inversely proportional to the probability that two stitched visitor identification records are related to the same user or the same household.

A probability may be determined to be an exact probability or a range of probabilities. In some embodiments, a probability may be given a label representing an exact probability or a range of probabilities. For example, a "very high" probability may represent a probability within a range of from 90% to 100% probable. In another example, a "high" probability may represent a probability within a range of from 80% to 89% probable. In yet another example, a "medium" probability may represent a determined probability within a range of from 60% to 79%. In another example, a "low" probability may represent a determined probability within a range of from 0% to 59%.

Generating stitched visitor IDs and determining probability associated with stitched visitor IDs are described in more detail with respect to FIGS. 4 and 5, discussed below.

After stitching, such as by records stitching component 112 of FIG. 1, visitor identification record 201B has been assigned a stitched visitor ID with a "very high probability", indicating it very probable that the stitched visitor ID associated with visitor identification record 201B represents one user or one household. Because the stitched visitor ID is only associated with one visitor identification record 201B, the user only visited the website once.

After stitching, visitor identification record 202B and visitor identification record 203B have been assigned a stitched visitor ID with a "high" probability, indicating it is somewhat probable that the stitched visitor ID associated with both visitor identification record 202B and visitor identification record 203B represent one user or household, based on the number of assumptions made in stitching visitor identification record 202B and visitor identification record 203B together. Because the stitched visitor ID is associated with both visitor identification record 202B and visitor identification record 203B, the visitor associated with visitor identification record 202B is the same as, or belongs to the same household as the visitor associated with visitor identification record 203B.

After stitching, visitor identification record 204B has been assigned a stitched visitor ID with a very high probability, indicating it is very highly probable that the stitched visitor ID associated with visitor identification record 204B represents one user or household. Because the stitched visitor ID is only associated with one visitor identification record 204B, the user only visited the website once.

After stitching, visitor identification record 205B and visitor identification record 206B have been assigned a stitched visitor ID with a "high" probability, indicating it is somewhat probable that the stitched visitor ID associated with both visitor identification record 205B and visitor identification record 206B represent one user or household. Because the stitched visitor ID is associated with both visitor identification record 205B and visitor identification record 206B, the visitor associated with visitor identification record 205B is the same as, or belongs to the same household as the user associated with visitor identification record 206B.

Example Process for Generating a Stitched Visitor ID

FIG. 3 depicts an example process flow for generating a stitched visitor ID, which may be assigned to all the visitor identification records associated with one user or one household.

In the depicted example, visitor identification records 302 and 303 have been stitched together and identified as representing one user or one household, such as by records stitching component 112 in FIG. 1.

Stitched visitor ID generator 320 generates stitched visitor ID 325 for visitor identification record 302 and visitor identification record 303.

In some embodiments, stitched visitor ID generator 320 generates a stitched visitor ID 325 based on one or more attributes of visitor identification records 302 and 303. For example, stitched visitor ID generator 320 may use a visitor ID, an IP address, and user-agent attributes to generate stitched visitor ID 325.

In some embodiments, stitched visitor ID generator 320 generates a stitched visitor ID 325 as simple plain text, obfuscated text, or encrypted text. For example, stitched visitor ID generator 320 may use a hashing function, such as SHA-1 or SHA-256 to generate a stitched visitor ID 325. In another example, stitched visitor ID generator 320 may use a universally unique identifier (UUID), such as UUID4, to generate a stitched visitor ID 325. In yet another example, stitched visitor ID generator 320 may use an encryption scheme to generate a stitched visitor ID 325. In some embodiments, stitched visitor ID generator 320 generates a stitched visitor ID 325 by concatenating various attributes of visitor identification records and/or scrambling the concatenated data. Note that these are just some examples, and many others are possible.

Example Process Flow for Generating Stitched Visitor IDs

Figure 4:
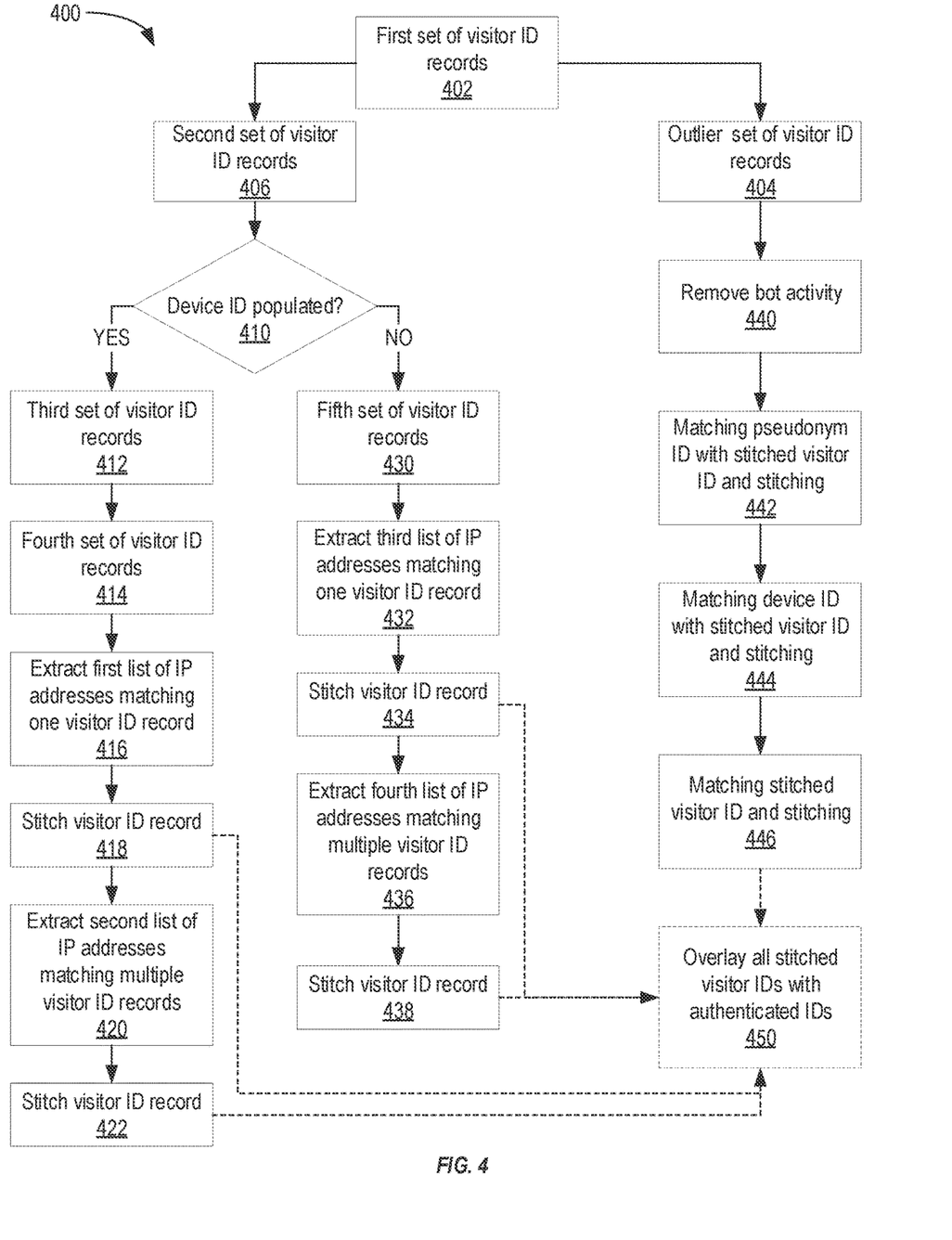
FIG. 4 depicts an example process flow for stitching visitor IDs.

FIG. 4 is an example process flow 400 for stitching visitor IDs, such as for a user tracking and identifying system like user tracking and identifying system 100 described with respect to FIG. 1. In one example, aspects of process flow 400 may be performed by records stitching component 112 described above with respect to FIG. 1.

Initially, flow 400 begins at step 402 with identifying a first set of visitor identification records, such as visitor identifications stored in visitor identification records database 110, depicted in FIG. 1.

Flow 400 then proceeds to step 404 with identifying an outlier set of visitor identification records from the first set of visitor identification records identified at step 402. In some embodiments, visitor identification records are identified as outlier based on one or more attribute of the visitor identification record.

For example, visitor identification records associated with bot activity may be identified as outlier visitor identification records. Bot activity may include activity associated with internet bots, such as high page views, high bounce rate, abnormal session durations, traffic from unknown or unusual locations, junk conversations and the like. In another example, visitor identification records associated with a target organization, such as IP addresses associated with the target organization may be identified as outlier visitor identification records. In yet another example, visitor identification records associated with multiple IP addresses may be identified as outlier visitor identification records. In yet another example, visitor identification records associated with an IP address associated with more than a threshold number of devices, such as IP addresses associated with more than seven devices may be identified as outlier visitor identification records. In yet another example, visitor identification records associated with an IP address, where the IP address is associated with more than a threshold number of visitor identification records may be identified as outlier visitor identification records. In another example, visitor identification records associated with multiple devices may be identified as outlier visitor identification records.

Flow 400 then proceeds to step 406 with identifying a second set of visitor identification records from the first set of visitor identification records identified at step 402 excluding the outlier set of visitor identification records identified at step 404. For example, if the first set of visitor identification records includes records A, B, C, D, E, F, G and H, and C is determined to be an outlier, then the second set includes records A, B, D, E, F, G and H.

Flow 400 then proceeds to step 410 with determining whether the context device ID field is populated for each visitor identification record in the second set of visitor identification records. For example, visitor identification records 201A, 202A, and 203A of FIG. 2, have a context device ID field that is populated.

Flow 400 then proceeds to step 412 with identifying a third set of visitor identification records based on the determination at step 410 that the context device ID field in the visitor identification record is populated. For example, if the second set of visitor identification records includes records A, B, D, E, F, G and H, and A, B, E and F have the context device ID field populated, then the third set includes records A, B, E and F.

Flow 400 then proceeds to step 414 with identifying a fourth set of visitor identification records associated with an IP address associated with the visitor identification records in the third set. A fourth set may be identified by determining for each visitor identification record in the third set, whether the IP address is also associated another visitor identification record in the second set of visitor identification records, as identified at step 406. If a visitor identification record in the second set is associated with an IP address also associated with a visitor identification record in the third set, then all visitor identification records associated with the IP address are added to the fourth set. For example, if the third set of visitor identification records includes records A, B, E and F, and the IP address associated with B is the same IP address as associated with G (from the second set identified at 406), then the fourth set includes records A, B, E, F and G.

Flow 400 then proceeds to step 416 with extracting a first list of IP addresses matching one visitor identification record in the fourth set of visitor identification records. A first list of IP addresses may be extracted by determining for each visitor identification record, whether the IP address is also associated with another visitor identification record in the fourth set. If the IP address is only associated with one visitor identification record, then the IP address is added to the first list. For example, visitor identification record 201A of FIG. 2, contains an IP address which is not associated with any other visitor identification record in the set (e.g., set 200 in FIG. 2), and would be added to the first list.

Flow 400 then proceeds to step 418 with stitching visitor identification records associated with IP addresses on the first list of IP addresses. For example, a stitched visitor ID may be assigned to each visitor identification record associated with IP addresses in the first list of IP addresses. For example, visitor identification record 201B in FIG. 2, has been assigned a stitched visitor ID. A stitched visitor ID may be generated based on attributes of the visitor identification record to which it is assigned, such as described with respect to FIG. 3. Further, at step 418, a probability may be determined for stitching visitor identification records based on the type and number of attributes and assumptions used to determine whether one or more visitor identification records are to be stitched together.

Flow 400 then proceeds to step 420 with extracting a second list of IP addresses matching multiple visitor identification records in the fourth set of visitor identification records. A second list of IP addresses may be extracted by determining for each IP address, all visitor identification records associated with that IP address. For example, visitor identification records 202A and 203A of FIG. 1 have the same IP address. Because a household may share an IP address, a possible assumption is that all visitor identification records associated with the same IP address are the same visitor or same household. In some cases, an IP address may not be associated with one household, such as a business, dorm, public library, and the like. For these cases, visitor identification records may be separate as outliers, such as visitor identification records associated with an IP address associated with more than a threshold number of devices, to prevent stitching of users not in the same household but with the same IP address.

Flow 400 then proceeds to step 422 with stitching all visitor identification records associated with the same IP address in the second list of IP addresses. In some embodiments, all visitor identification records associated with the same IP address may be assigned the same stitched visitor ID to associate each visitor identification record with all others matching the same IP address. For example, visitor identification records 202B and 203B of FIG. 2, have the same stitched visitor ID. Further, at step 422, a probability may be determined for stitching visitor identification records based on the type and number of attributes and assumptions used to determine whether one or more visitor identification records are to be stitched together.

Flow 400 then proceeds to step 430 with identifying a fifth set of visitor identification records including all visitor identification records identified in the second set of visitor identification records where the context device ID is not populated (e.g., null), except those in the fourth set of visitor identification records. For example, if the second set of visitor identification records includes records A, B, D, E, F, G and H, and the fourth set of visitor identification records includes records A, B, E, F and G, then the fifth set of visitor identification records includes records D and H. Flow 400 then proceeds to step 432 with extracting a third list of IP addresses matching only one visitor identification record in the fifth set of visitor identification records. In other words, for each visitor identification record, it may be determined whether the IP address is also associated with another visitor identification record. If the IP address is only associated with on visitor identification record, then the IP address is added to the third list. For example, visitor identification record 204A of FIG. 2 contains an IP address which is not associated with any other visitor identification record in the set (e.g., set 200 in FIG. 2).

Flow 400 then proceeds to step 434 with stitching visitor identification records associated with IP addresses in the third list of IP addresses. In some embodiments, stitching visitor identification records may be assigning each visitor identification record associated with IP addresses on the third list of IP addresses a stitched visitor ID. For example, visitor identification record 204B in FIG. 2, has been assigned a stitched visitor ID. Further, at step 434, a probability may be determined associated with stitching visitor identification records based on the type and number of attributes and assumptions used to determine whether one or more visitor identification records are to be stitched together.

Flow 400 then proceeds to step 436 with extracting a fourth list of IP addresses matching multiple visitor identification records in the fourth set of visitor identification records. A fourth list of IP addresses may be extracted by determining for each IP address, all visitor records associated with that IP address. For example, visitor identification records 205A and 206A of FIG. 2 have the same IP address, and the IP address may be extracted to a fourth list. Because a household may share an IP address a possible assumption is that all visitor identification records associated with the same IP address are the same user or same household. In some cases, an IP address may not be associated with one household, such as a business, dorm, public library, and the like. For these cases, visitor identification records may be separate as outliers, as discussed above, to only stitch visitor identification records associated with a household.

Flow 400 then proceeds to step 438 with stitching all visitor identification records associated with the same IP address on the fourth list of IP addresses. In some embodiments, all visitor identification records associated with the same IP address may be assigned the same stitched visitor ID to associate each visitor identification record with all others matching the same IP address. For example, visitor identification records 205B and 206B of FIG. 2 have the same stitched visitor ID. Further, at step 438, a probability may be determined associated with stitching visitor identification records based on the type and number of attributes and assumptions used to determine whether one or more visitor identification records are to be stitched together.

Flow 400 then returns to the outlier set of visitor identification records from the first set of visitor identification records, identified at step 404.

Flow 400 then proceeds to step 440 with removing visitor identification records associated with bot activity (as described above) from the set of outlier visitor identification records.

Flow 400 then proceeds to step 442 with identifying outlier visitor identification records with a pseudonym ID matching stitched visitor IDs, and stitching the outlier visitor identification record to the stitched visitor ID with the matching pseudonym ID.

For example, an outlier visitor identification record with the pseudonym ID field in the visitor identification record populated may be identified. If the outlier visitor identification record with pseudonym ID matches a pseudonym ID in a visitor identification record with a stitched visitor ID, then the outlier visitor identification record may also be stitched with the stitched visitor ID. If the outlier visitor identification record with pseudonym ID does not match a pseudonym ID in a stitched visitor record, then the outlier visitor identification record remains an outlier visitor identification record. The outlier visitor identification record is assigned a stitched visitor ID may be removed from the set of outlier visitor identification records. Further, a probability may be determined associated with stitching visitor identification records based on the type and number of attributes and assumptions used to determine whether one or more visitor identification records are to be stitched together.

Flow 400 then proceeds to step 444 with identifying outlier visitor identification records with a context device ID matching stitched visitor IDs, and stitching the outlier visitor identification record to the stitched visitor ID with the matching context device ID.

For example, an outlier visitor identification record with the context device ID field in the visitor identification record populated may be identified. If the outlier visitor identification record with context device ID matches a context device ID in a visitor identification record with a stitched visitor ID, then the outlier visitor identification record may also be stitched with the stitched visitor ID. If the outlier visitor identification record with pseudonym ID does not match a pseudonym ID in a visitor identification record, then the outlier visitor identification record remains an outlier visitor identification record. The outlier visitor ID assigned a stitched visitor ID may be removed from the set of outlier visitor identification records. Further, at step 446, a probability may be determined associated with stitching visitor identification records based on the type and number of attributes and assumptions used to determine whether one or more visitor identification records are to be stitched together.

Flow 400 then proceeds to step 444 with identifying outlier visitor identification records already assigned a stitched visitor ID. For example, a visitor identification record may have already been assigned a stitched visitor ID at steps 418, 422, 434, or 438, discussed above.

Optionally, flow 400 then proceeds to step 450 with overlaying all stitched visitor IDs with authenticated IDs to determine the accuracy of the stitching. At step 448, all stitched visitor identification records, such as those stitched at steps 418, 422, 434, 438, 442, 444, or 446, are matched to authenticated identification records to associate stitched visitor identification records with authenticated identification records.

Note that flow 400 is just one example, and other methods including fewer, additional, or alternative steps, consistent with this disclosure, are possible.

Example Method for Generating Stitched Visitor Identification Records

Figure 5:
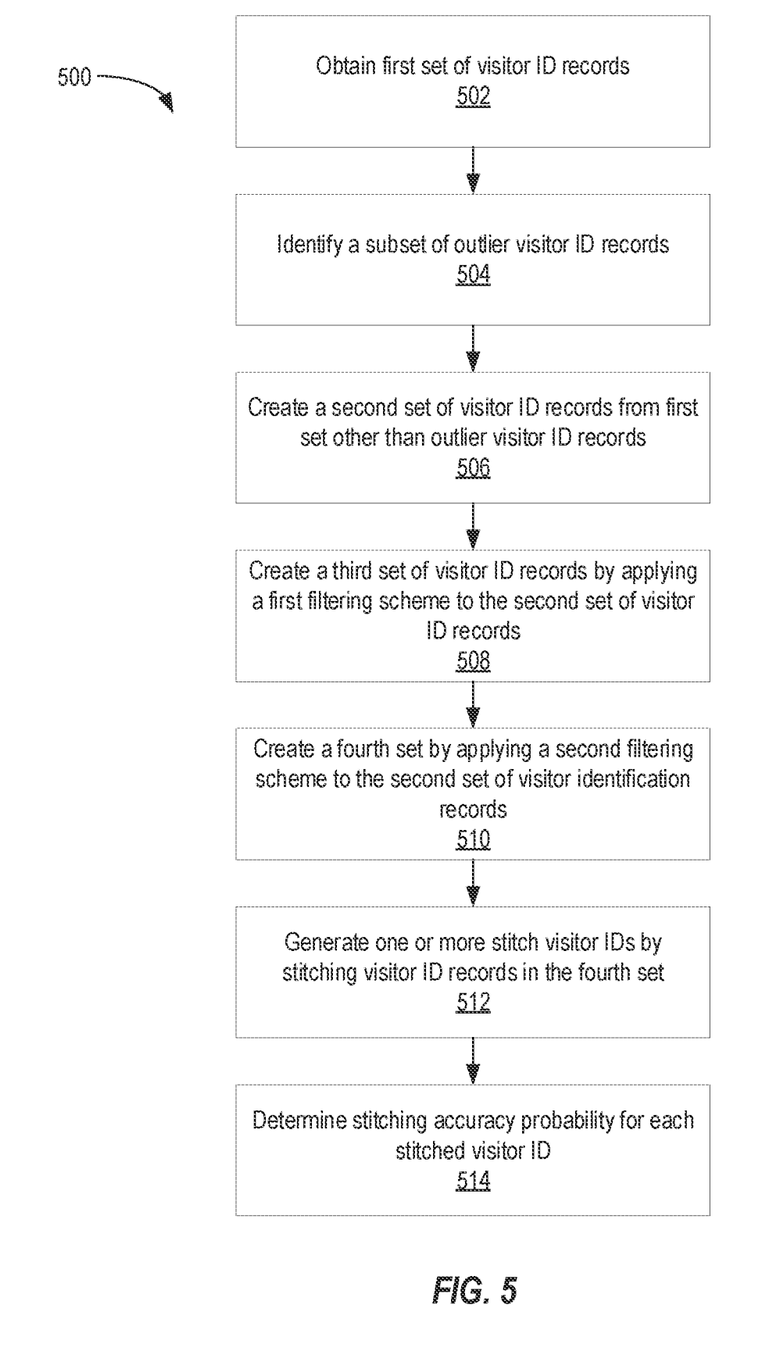
FIG. 5 depicts an example method for stitching visitor IDs.

FIG. 5 depicts an example method 500 for generating stitched visitor identification records.

Method 500 begins at step 502 with obtaining a first set of visitor identification records, such as set of visitor identification records 200 in FIG. 2.

In some embodiments, each visitor identification record comprises: an IP address field; a user-agent attribute field; a visitor ID field; a date and time field; and optionally further comprises one or more of: a context device ID field; and a pseudonym ID field.

Method 500 proceed to step 504 with identifying a subset of outlier visitor identification records within the first set of visitor identification records, such as outlier visitor identification records identified at step 404 in FIG. 4.

In some embodiments, identifying the subset of outlier visitor identification records within the first set of visitor identification records comprises identifying one or more of: visitor identification records associated with bot activity; visitor identification records associated with a target organization; visitor identification records associated with multiple IP address; visitor identification records associated with an IP address associated with more than a threshold number of devices; visitor identification records associated with an IP address, wherein the IP address is associated with more than a threshold number of visitor identification records; and visitor identification records associated with multiple devices.

In some embodiments, the threshold number of devices comprises five, six, seven, eight, or nine devices.

In some embodiments, the threshold number of visitor identification records is ten, eleven, twelve, thirteen, fourteen, or fifteen visitor identification records.

Method 500 proceeds to step 506 with creating a second set of visitor identification records including all visitor identification records from the first set of visitor identification records other than the subset of outlier visitor identification records, such has the second set of visitor identification records identified at step 406 of FIG. 4.

Method 500 proceeds to step 508 with creating a third set of visitor identification records, such as the third set of visitor identification records identified at step 412 of FIG. 4, by applying a first filtering scheme to the second set of visitor identification records.

In some embodiments, applying the first filtering scheme comprises: adding all visitor identification records in the second set of visitor identification records in which a context device ID field is populated to the third set of visitor identification records.

Method 500 proceeds to step 510 with creating a fourth set of visitor identification records, such as the fourth set of visitor identification records identified at step 414 of FIG. 4, by applying a second filtering scheme to the second set of visitor identification records.

In some embodiments, applying the second filtering scheme comprises: determining a set of IP addresses in the third set of visitor identification records; and adding all visitor identification records in the second set of visitor identification records associated with an IP address in the set of IP addresses to the fourth set of visitor identification records.

Method 500 proceeds to step 512 with generating one or more stitched visitor IDs by stitching visitor identification records in the fourth set of visitor identification records, such as stitching performed at steps 418 and 422 of FIG. 4.

In some embodiments, stitching visitor identification records in the fourth set of visitor identification records comprises: extracting a first list of IP addresses matching only one visitor identification record in the fourth set of visitor identification records; generating a stitched visitor ID for each visitor identification record associated with an IP address in the first list of visitor identification records; extracting a second list of IP addresses matching more than one visitor identification record in the fourth set of visitor identification records; and generating a stitched visitor ID for each visitor identification record associated with an IP address in the second list of visitor identification records.

Method 500 proceeds to step 514 with determining a stitching accuracy probability for each of the one or more stitched visitor IDs.

In some embodiments, method 500 further includes creating a fifth set of visitor identification records including visitor identification records from the second set of visitor identification records other than visitor identification records from the fourth set of visitor identification records; and stitching visitor identification records in the fifth set of visitor identification records. The fifth set of visitor identification records may be the fifth set of visitor identification records identified at step 430 of FIG. 4.

In some embodiments, stitching visitor identification records in the fifth set of visitor identification records comprises: extracting a third list of IP addresses matching only one visitor identification record in the fifth set of visitor identification records; generating a stitched visitor ID for each visitor identification record associated with an IP address in the third list of visitor identification records; extracting a fourth list of IP addresses matching more than one visitor identification record in the fifth set of visitor identification records; and generating a stitched visitor ID for each visitor identification record associated with an IP address in the fourth list of visitor identification records.

In some embodiments, method 500 further includes stitching visitor identification records in the subset of outlier visitor identification records, such as stitching the outlier set of visitor identification records at steps 442, 444, and 446 of FIG. 4.

In some embodiments, stitching visitor identification records in the subset of outlier visitor identification records comprises: removing any visitor identification records in the subset of outlier visitor identification records associated with bot activity; identifying any respective visitor identification records in the subset of outlier visitor identification records associated with a respective pseudonym ID matching a stitched visitor ID with the respective pseudonym ID and generating a stitched visitor ID for each respective visitor identification record in the subset of outlier visitor identification records associated with the respective pseudonym ID; identifying any respective visitor identification records in the subset of outlier visitor identification records associated with a respective context device ID matching a stitched visitor ID with the respective context device ID with the stitched visitor ID and generating a stitched visitor ID for each respective visitor identification record in the subset of outlier visitor identification records associated with the respective context device ID; and identifying any visitor identification records in the subset of outlier visitor identification records associated with a stitched visitor ID and generating a stitched visitor ID for each respective visitor identification record.

In some embodiments, a first subset of the first set of visitor identification records are associated with a mobile application, and a second subset of the first set of visitor identification records are associated with a web-based application.

In some embodiments, each visitor identification record comprises one or more of the following fields: an IP address field; a context device ID field: a user-agent attribute field; and a pseudonym ID field.

Note that method 500 is just one example, and other methods including fewer, additional, or alternative steps, consistent with this disclosure, are possible.

Example Computing Device

Figure 6:
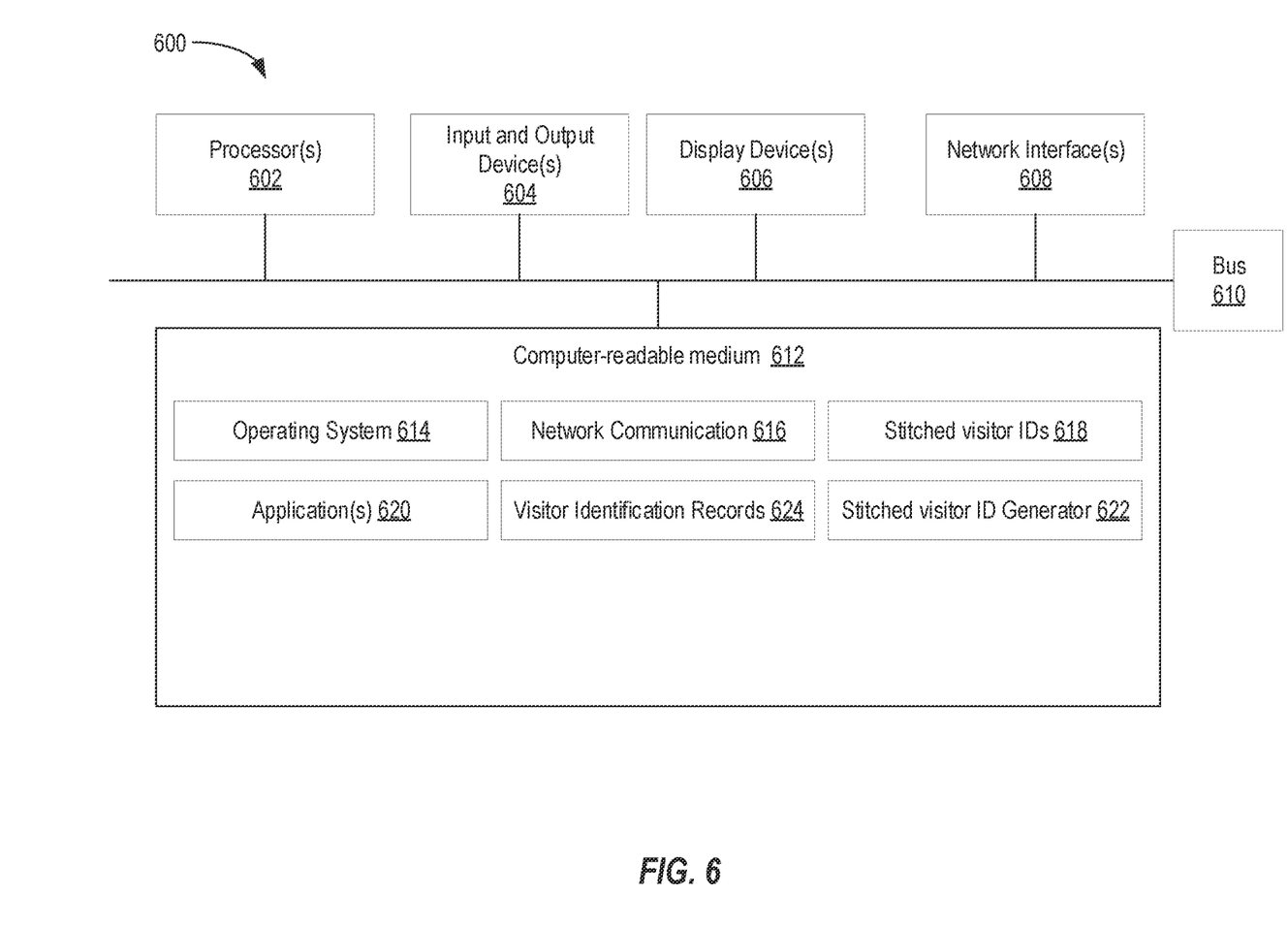
FIG. 6 depicts a block diagram of an example computing device that implements various features and processes, based on the method disclosed herein.

FIG. 6 depicts a block diagram of an example computing device 600 that implements various features and processes, based on the methods described herein. For example, computing device may perform one or more steps of the flow 400 and method 500. The computing device 600 is implemented on any electronic device that runs software applications derived from complied instructions, including without limitation, personal computers, servers, smart phones, media players, electronic tablets, game consoles, email devices, etc. In some implementations, the computing device 600 includes one or more processors 602, one or more input devices 604, one or more display devices 606, one or more network interfaces 608, and one or more computer-readable medium 612. Each of these components may be coupled by a bus 610.

Display devices 606 includes any display technology, including but not limited to display devices using Liquid Crystal Display (LCD) or Light Emitting Diode (LED) technology. Processor(s) 602 may use any processor technology, including but not limited to graphics processors and multi-core processors. Input devices 604 may include any known input device technology, including but not limited to a keyboard (including a virtual keyboard), mouse, track ball, and touch-sensitive pad or display. Bus 610 includes any internal or external bus technology, including but not limited to, ISA, EISA, PCI, PCI Express, USB, Serial ATA or FireWire. Computer-readable medium 612 includes any non-transitory computer readable medium that provides instructions to processor(s) 602 for executing, including without limitation, non-volatile storage media (e.g., optical discs, magnetic disks, flash drives, etc.), or volatile media (e.g., SDRAM, ROM, etc.).

Computer-readable medium 612 includes various instructions 614 for implementing an operating system (e.g., Mac OS®, Windows®, Linux). The operating system may be multi-user, multiprocessing, multitasking, multithreading, real-time, and the like. The operating system performs basic tasks, including but not limited to: recognizing input from input device 604; sending output to display device 606; keeping track of files and directories on computer-readable medium 612; controlling peripheral devices (e.g., disk drives, printers, etc.) which can be controlled directly or through an I/O controller; and managing traffic on bus 610. Network communications instructions 616 establish and maintain network connections (e.g., software for implementing communication protocols, such as TCP/IP, HTTP, Ethernet, telephony, etc.).

Stitched visitor IDs 618 include data relating to stitched visitor IDs, such as stitched visitor ID 325 in FIG. 3.

Application(s) 620 may comprise an application that uses or implements the processes described herein and/or other processes. The processes may also be implemented in the operating system.

Visitor identification records 624 may include data relating to visitor identification records, such as that described as visitor identification records database 110 in FIG. 1.

Stitched visitor ID generator 622 may include instructions that implement the disclosed process for a generating stitched visitor IDs from visitor identification records, such as stitched visitor ID generator 320 in FIG. 3.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment. In one embodiment, this may include Python. The computer programs therefore are polyglots.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication network include, e.g., a telephone network, a LAN, a WAN, and the computers and network forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Example Clauses

Implementation examples are described in the following numbered clauses:

Clause 1: A method for managing users, the method comprising: obtaining a first set of visitor identification records; identifying a subset of outlier visitor identification records within the first set of visitor identification records; creating a second set of visitor identification records including all visitor identification records from the first set of visitor identification records other than the subset of outlier visitor identification records; creating a third set of visitor identification records by applying a first filtering scheme to the second set of visitor identification records; creating a fourth set of visitor identification records by applying a second filtering scheme to the second set of visitor identification records; generating one or more stitched visitor IDs by stitching visitor identification records in the fourth set of visitor identification records; and determining a stitching accuracy probability for each of the one or more stitched visitor IDs.

Clause 2: The method of Clause 1, wherein identifying the subset of outlier visitor identification records within the first set of visitor identification records comprises identifying one or more of: visitor identification records associated with bot activity; visitor identification records associated with a target organization; visitor identification records associated with multiple IP addresses; visitor identification records associated with an IP address associated with more than a threshold number of devices; visitor identification records associated with an IP address, wherein the IP address is associated with more than a threshold number of visitor identification records; and visitor identification records associated with multiple devices.

Clause 3: The method of any one of Clauses 1-2, wherein applying the first filtering scheme comprises: adding all visitor identification records in the second set of visitor identification records in which a context device ID field is populated to the third set of visitor identification records.

Clause 4: The method of any one of Clauses 1-3, wherein applying the second filtering scheme comprises: determining a set of IP addresses in the third set of visitor identification records; and adding all visitor identification records in the second set of visitor identification records associated with an IP address in the set of IP addresses to the fourth set of visitor identification records.

Clause 5: The method of Clause 4, wherein stitching visitor identification records in the fourth set of visitor identification records comprises: extracting a first list of IP addresses matching only one visitor identification record in the fourth set of visitor identification records; generating a stitched visitor ID for each visitor identification record associated with an IP address in the first list of visitor identification records; extracting a second list of IP addresses matching more than one visitor identification record in the fourth set of visitor identification records; and generating a stitched visitor ID for each visitor identification record associated with an IP address in the second list of visitor identification records.

Clause 6: The method of any one of Clauses 1-5, further comprising: creating a fifth set of visitor identification records including visitor identification records from the second set of visitor identification records other than visitor identification records from the fourth set of visitor identification records; and stitching visitor identification records in the fifth set of visitor identification records.

Clause 7: The method of Clause 6, wherein stitching visitor identification records in the fifth set of visitor identification records comprises: extracting a third list of IP addresses matching only one visitor identification record in the fifth set of visitor identification records; generating a stitched visitor ID for each visitor identification record associated with an IP address in the third list of visitor identification records; extracting a fourth list of IP addresses matching more than one visitor identification record in the fifth set of visitor identification records; and generating a stitched visitor ID for each visitor identification record associated with an IP address in the fifth list of visitor identification records.

Clause 8: The method of any one of Clauses 1-7, further comprising stitching visitor identification records in the subset of outlier visitor identification records.

Clause 9: The method of Clause 8, wherein stitching visitor identification records in the subset of outlier visitor identification records comprises: removing any visitor identification records in the subset of outlier visitor identification records associated with bot activity; identifying any respective visitor identification records in the subset of outlier visitor identification records associated with a respective pseudonym ID matching a stitched visitor ID with the respective pseudonym ID and generating a stitched visitor ID for each respective visitor identification record in the subset of outlier visitor identification records associated with the respective pseudonym ID; identifying any respective visitor identification records in the subset of outlier visitor identification records associated with a respective context device ID matching a stitched visitor ID with the respective context device ID with the stitched visitor ID and generating a stitched visitor ID for each respective visitor identification record in the subset of outlier visitor identification records associated with the respective context device ID; and identifying any visitor identification records in the subset of outlier visitor identification records associated with a stitched visitor ID and generating a stitched visitor ID for each respective visitor identification record. Clause 10: The method of any one of Clauses 1-9, wherein each visitor identification record comprises: an IP address field; a user-agent attribute field; a visitor ID field; a date and time field; and optionally further comprises one or more of: a context device ID field; and a pseudonym ID field.

Clause 11: The method of any one of Clauses 1-10, wherein: a first subset of the first set of visitor identification records are associated with a mobile application, and a second subset of the first set of visitor identification records are associated with a web-based application.

Clause 12: The method of Clause 2, wherein the threshold number of devices comprises seven devices.

Clause 13: The method of Clause 2, wherein the threshold number of visitor identification records is fourteen visitor identification records.

Clause 14: A processing system, comprising: a memory comprising computer-executable instructions; and a processor configured to execute the computer-executable instructions and cause the processing system to perform a method in accordance with any one of Clauses 1-13.

Clause 15: A processing system, comprising means for performing a method in accordance with any one of Clauses 1-13.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for managing users, the method comprising:
   obtaining a first set of visitor identification records;
   identifying a subset of outlier visitor identification records within the first set of visitor identification records;
   creating a second set of visitor identification records including all visitor identification records from the first set of visitor identification records other than the subset of outlier visitor identification records;
   creating a third set of visitor identification records by applying a first filtering scheme to the second set of visitor identification records;
   creating a fourth set of visitor identification records by applying a second filtering scheme to the second set of visitor identification records;
   generating one or more stitched visitor IDs by stitching visitor identification records in the fourth set of visitor identification records; and
   determining a stitching accuracy probability for each of the one or more stitched visitor IDs.

2. The method of claim 1, wherein identifying the subset of outlier visitor identification records within the first set of visitor identification records comprises identifying one or more of:
   visitor identification records associated with bot activity;
   visitor identification records associated with a target organization;
   visitor identification records associated with multiple IP addresses;
   visitor identification records associated with an IP address associated with more than a threshold number of devices;
   visitor identification records associated with an IP address, wherein the IP address is associated with more than a threshold number of visitor identification records; and
   visitor identification records associated with multiple devices.

3. The method of claim 1, wherein applying the first filtering scheme comprises adding all visitor identification records in the second set of visitor identification records in which a context device ID field is populated to the third set of visitor identification records.

4. The method of claim 1, wherein applying the second filtering scheme comprises:
   determining a set of IP addresses in the third set of visitor identification records; and
   adding all visitor identification records in the second set of visitor identification records associated with an IP address in the set of IP addresses to the fourth set of visitor identification records.

5. The method of claim 4, wherein stitching visitor identification records in the fourth set of visitor identification records comprises:
   extracting a first list of IP addresses matching only one visitor identification record in the fourth set of visitor identification records;
   generating a stitched visitor ID for each visitor identification record associated with an IP address in the first list of visitor identification records;
   extracting a second list of IP addresses matching more than one visitor identification record in the fourth set of visitor identification records; and
   generating a stitched visitor ID for each visitor identification record associated with an IP address in the second list of visitor identification records.

6. The method of claim 1, further comprising:
   creating a fifth set of visitor identification records including visitor identification records from the second set of visitor identification records other than visitor identification records from the fourth set of visitor identification records; and
   stitching visitor identification records in the fifth set of visitor identification records.

7. The method of claim 6, wherein stitching visitor identification records in the fifth set of visitor identification records comprises:
- extracting a third list of IP addresses matching only one visitor identification record in the fifth set of visitor identification records;
- generating a stitched visitor ID for each visitor identification record associated with an IP address in the third list of visitor identification records;
- extracting a fourth list of IP addresses matching more than one visitor identification record in the fifth set of visitor identification records; and
- generating a stitched visitor ID for each visitor identification record associated with an IP address in the fourth list of visitor identification records.

8. The method of claim 1, further comprising stitching visitor identification records in the subset of outlier visitor identification records.

9. The method of claim 8, wherein stitching visitor identification records in the subset of outlier visitor identification records comprises:
- removing any visitor identification records in the subset of outlier visitor identification records associated with bot activity;
- identifying any respective visitor identification records in the subset of outlier visitor identification records associated with a respective pseudonym ID matching a stitched visitor ID with the respective pseudonym ID and generating a stitched visitor ID for each respective visitor identification record in the subset of outlier visitor identification records associated with the respective pseudonym ID;
- identifying any respective visitor identification records in the subset of outlier visitor identification records associated with a respective context device ID matching a stitched visitor ID with the respective context device ID with the stitched visitor ID and generating a stitched visitor ID for each respective visitor identification record in the subset of outlier visitor identification records associated with the respective context device ID; and
- identifying any visitor identification records in the subset of outlier visitor identification records associated with a stitched visitor ID and generating a stitched visitor ID for each respective visitor identification record.

10. The method of claim 1, wherein each visitor identification record comprises:
- an IP address field;
- a user-agent attribute field;
- a visitor ID field;
- a date and time field; and
- optionally further comprises one or more of:
  - a context device ID field; and
  - a pseudonym ID field.

11. The method of claim 1, wherein:
- a first subset of the first set of visitor identification records are associated with a mobile application, and
- a second subset of the first set of visitor identification records are associated with a web-based application.

12. The method of claim 2, wherein the threshold number of devices comprises seven devices.

13. The method of claim 2, wherein the threshold number of visitor identification records is fourteen visitor identification records.

14. A processing system, comprising: a memory comprising computer-executable instructions; and a processor configured to execute the computer-executable instructions and cause the processing system to:
- obtain a first set of visitor identification records;
- identify a subset of outlier visitor identification records within the first set of visitor identification records;
- create a second set of visitor identification records including all visitor identification records from the first set of visitor identification records other than the subset of outlier visitor identification records;
- create a third set of visitor identification records by applying a first filtering scheme to the second set of visitor identification records;
- create a fourth set of visitor identification records by applying a second filtering scheme to the second set of visitor identification records;
- generate one or more stitched visitor IDs by stitching visitor identification records in the fourth set of visitor identification records; and
- determine a stitching accuracy probability for each of the one or more stitched visitor IDs.

15. The processing system of claim 14, wherein in order to apply the first filtering scheme, the processor is further configured to cause the processing system to add all visitor identification records in the second set of visitor identification records in which a context device ID field is populated to the third set of visitor identification records.

16. The processing system of claim 14, wherein in order to apply the second filtering scheme, the processor is further configured to cause the processing system to:
- determine a set of IP addresses in the third set of visitor identification records; and
- add all visitor identification records in the second set of visitor identification records associated with an IP address in the set of IP addresses to the fourth set of visitor identification records.

17. The processing system of claim 16, wherein in order to stitch visitor identification records in the fourth set of visitor identification records, the processor is further configured to cause the processing system to:
- extract a first list of IP addresses matching only one visitor identification record in the fourth set of visitor identification records;
- generate a stitched visitor ID for each visitor identification record associated with an IP address in the first list of visitor identification records;
- extract a second list of IP addresses matching more than one visitor identification record in the fourth set of visitor identification records; and
- generate a stitched visitor ID for each visitor identification record associated with an IP address in the second list of visitor identification records.

18. The processing system of claim 14, wherein the processor is further configured to cause the processing system to:
- create a fifth set of visitor identification records including visitor identification records from the second set of visitor identification records other than visitor identification records from the fourth set of visitor identification records; and
- stitch visitor identification records in the fifth set of visitor identification records,
- wherein in order to stitch visitor identification records in the fifth set of visitor identification records, the processor is further configured to cause the processing system to:

extract a third list of IP addresses matching only one visitor identification record in the fifth set of visitor identification records;

generate a stitched visitor ID for each visitor identification record associated with an IP address in the third list of visitor identification records;

extract a fourth list of IP addresses matching more than one visitor identification record in the fifth set of visitor identification records; and generate a stitched visitor ID for each visitor identification record associated with an IP address in the fourth list of visitor identification records.

19. The processing system of claim 14, wherein the processor is further configured to cause the processing system to stitch visitor identification records in the subset of outlier visitor identification records, wherein in order to stitch the visitor identification records in the subset of outlier visitor identification records, the processor is further configured to cause the processing system to:

remove any visitor identification records in the subset of outlier visitor identification records associated with bot activity;

remove any visitor identification records in the subset of outlier visitor identification records associated with a stitched visitor ID;

identify any respective visitor identification records in the subset of outlier visitor identification records associated with a respective pseudonym ID matching a stitched visitor ID with the respective pseudonym ID and generating a stitched visitor ID for each respective visitor identification record in the subset of outlier visitor identification records associated with the respective pseudonym ID;

identify any respective visitor identification records in the subset of outlier visitor identification records associated with a respective context device ID matching a stitched visitor ID with the respective context device ID with the stitched visitor ID and generating a stitched visitor ID for each respective visitor identification record in the subset of outlier visitor identification records associated with the respective context device ID; and identify any visitor identification records in the subset of outlier visitor identification records associated with a stitched visitor ID and generating a stitched visitor ID for each respective visitor identification record.

20. A method for managing users, the method comprising:

obtaining a first set of visitor identification records;

identifying a subset of outlier visitor identification records within the first set of visitor identification records;

creating a second set of visitor identification records including all visitor identification records from the first set of visitor identification records other than the subset of outlier visitor identification records;

creating a third set of visitor identification records by applying a first filtering scheme to the second set of visitor identification records, comprising;

adding all visitor identification records in the second set of visitor identification records in which a context device ID field is populated to the third set of visitor identification records;

creating a fourth set of visitor identification records by applying a second filtering scheme to the second set of visitor identification records, comprising:

determining a set of IP addresses in the third set of visitor identification records; and adding all visitor identification records in the second set of visitor identification records associated with an IP address in the set of IP addresses to the fourth set of visitor identification records;

generating one or more stitched visitor IDs by stitching visitor identification records in the fourth set of visitor identification records;

creating a fifth set of visitor identification records including visitor identification records from the second set of visitor identification records other than visitor identification records from the fourth set of visitor identification records;

stitching visitor identification records in the fifth set of visitor identification records; and determining a stitching accuracy probability for each of the one or more stitched visitor IDs.

* * * * *